United States Patent

[11] 3,536,085

| [72] | Inventor | Lael B. Taplin |
| | | Livonia, Michigan |
| [21] | Appl. No. | 711,307 |
| [22] | Filed | March 7, 1968 |
| [45] | Patented | Oct. 27, 1970 |
| [73] | Assignee | The Bendix Corporation |
| | | a corporation of Delaware |

[54] FLUID ACTUATED VALVE ASSEMBLY
10 Claims, 4 Drawing Figs.

[52] U.S. Cl................................................ 137/81.5
[51] Int. Cl................................................. F15c 3/02
[50] Field of Search................................... 137/81.5,
596.14, 596.15; 91/3

[56] References Cited
UNITED STATES PATENTS

| 2,984,218 | 5/1961 | Christianson............... | 137/596.15 |
| 3,010,479 | 11/1961 | Foley........................... | 137/596.15 |
| 3,124,999 | 3/1964 | Woodward................... | 137/81.5X |
| 3,141,383 | 7/1964 | Abild........................... | 137/596.15X |
| 3,273,594 | 9/1966 | Mayer.......................... | 137/81.5X |
| 3,383,038 | 5/1968 | Boothe......................... | 137/81.5X |
| 3,390,611 | 7/1968 | Warren........................ | 137/81.5X |
| 3,410,291 | 11/1968 | Boothe et al................ | 137/81.5 |
| 3,444,877 | 5/1969 | Atchley....................... | 137/81.5 |
| 3,444,878 | 5/1969 | Mayer.......................... | 137/81.5 |

*Primary Examiner*—Samuel Scott
*Attorney*—Plante, Hartz, Smith and Thompson

ABSTRACT: A two-stage servovalve with a fluidic first or pilot stage. The second stage is a mechanical spool valve and the fluidic pilot stage consists of a pair of vortex fluid amplifiers located at the ends of the spool so that the spool is driven by differential pressure on the spool ends created by the amplifiers. The fluid amplifiers are provided with controllable fluid inputs which are adjustable to shift the spool, and feedback fluid inputs which are automatically adjusted in response to spool movement to balance the pressures on the spool ends in shifted positions of the spool.

Patented Oct. 27, 1970 3,536,085

INVENTOR
LAEL B. TAPLIN

BY

*James L. O'Brien*

ATTORNEY

FLUID ACTUATED VALVE ASSEMBLY

Two-stage servovalves are conventionally provided with mechanical or electrical pilot stages. In certain environments, a fluidic pilot stage is desirable.

It is an object of this invention, therefore, to provide an improved two-stage servovalve in which the first or pilot stage is fluid actuated.

In the valve assembly of this invention, a spool is mounted for axial shifting movement in a hollow body. The end portions of the spool are of cylindrical shape and the body is provided with end cavities in which the cylindrical spool end portions are positioned. These cavities cooperate with the cylindrical spool end portions to form vortex chambers and the end walls of the body are formed with openings that function as exit passages for the vortex chambers.

Each vortex chamber is provided with a source of supply fluid and a pair of control fluid inlets which direct fluid tangentially into the chamber to cause swirl of the fluid therein. One of these fluid inlets is connected to an adjustable supply. Thus, when the pressures at these adjustable supply inlets are equal, the pressures in the vortex chambers, and thus the pressures on the spool ends, are equal so that the spool is maintained in a centered position. When the pressure at one of these inlets is increased relative to the pressure at the other inlet, the vortical flow through the exit passage for the vortex chamber provided with control fluid at the increased pressure is reduced so that the pressure on the spool end disposed in that chamber is increased causing the spool to shift and actuate the second stage.

The other control fluid inlet for each vortex chamber is a feedback fluid input. The passage which supplies feedback fluid has an outlet disposed in an exit chamber formed in the valve body intermediate the ends of the spool. This outlet is in the form of a port disposed in a closely spaced relation with an inclined surface portion of the valve spool so that the spool surface portion restricts flow of fluid out of the outlet port. The surface portions on the valve spool which restrict the feedback outlet ports for the two vortex chambers are reversely inclined. Thus, in response to shifting movement of the spool in one direction, the feedback port for the chamber in which the input pressure has been decreased, is further restricted, and the restriction of the feedback port for the chamber in which the pressure has been increased is reduced. This results in an increase of the feedback fluid supplied to the low-pressure chamber and a decrease in the pressure of the feedback fluid supplied to the increased pressure chamber. As a result, the pressures in the vortex chambers are equalized in the shifted position of the spool, with the magnitude of shifting movement of the spool being dependent upon the initial magnitude of the pressure differential created in the vortex chambers.

The valve assembly of this invention, in the shifted positions of the spool provides for varying flow through the usual valve outlets. Thus, the valve assembly of this invention operates as a fluid power amplifier with fluid inputs. It has an ability to quickly respond to pilot stage actuation so that it will readily change from low power to high power conditions and vice versa. In addition, the valve assembly will operate over a wide temperature range such as a range between room temperature and 1,000°F.

Further objects, features and advantages of this invention will become apparent from a consideration of the following description, the appended claims, and the accompanying drawing in which:

Figure 1:
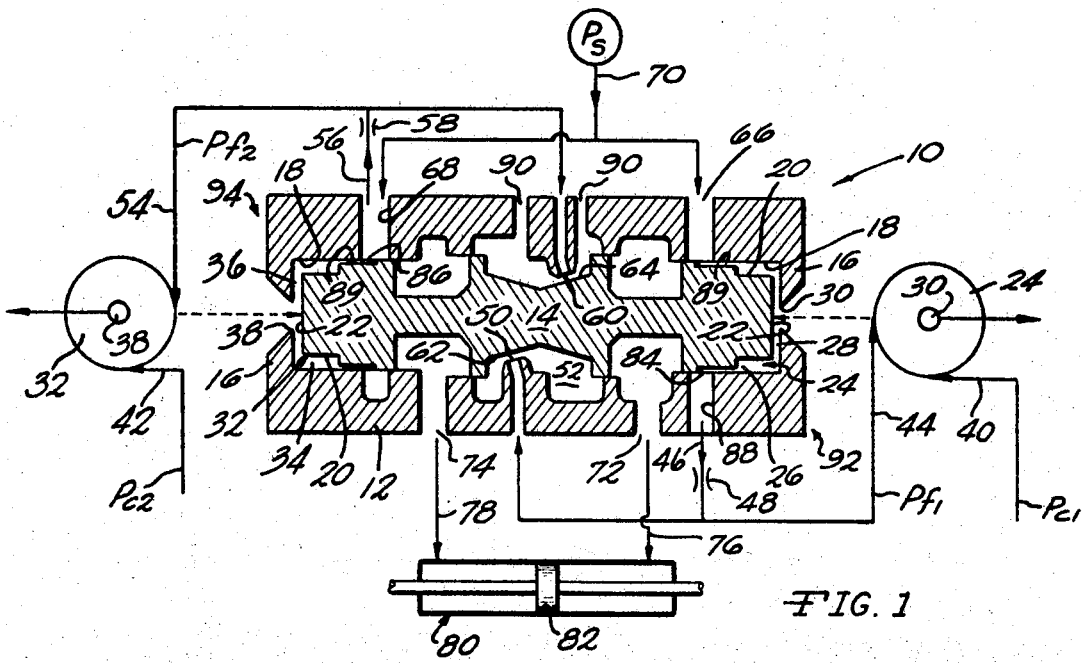
FIG. 1 is a schematic illustration of the valve assembly of this invention, illustrating the spool in the valve assembly in a centered position.
Figure 2:
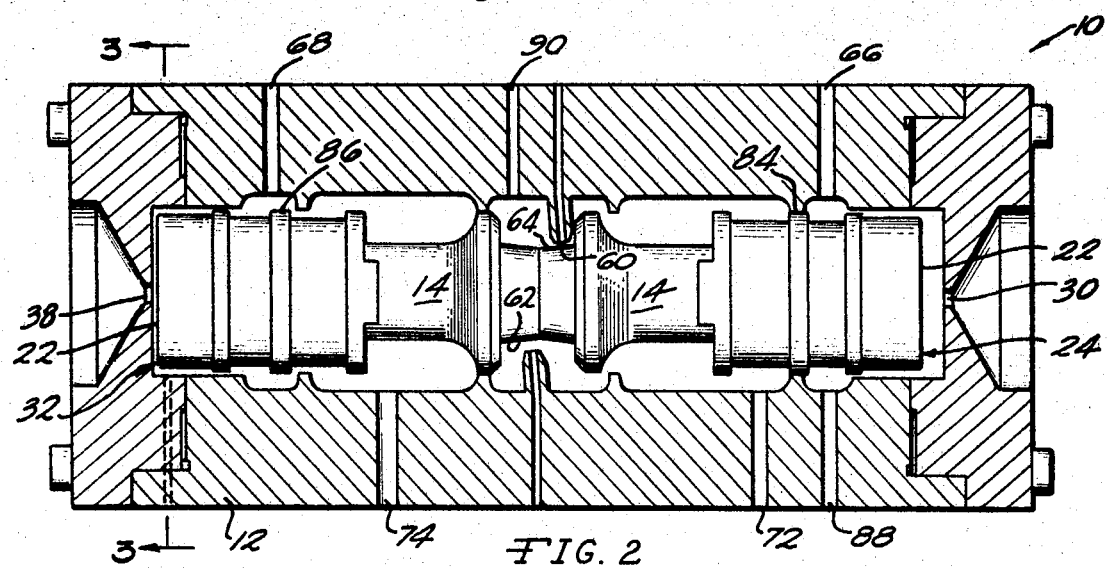
FIG. 2 is a longitudinal sectional view of the valve assembly of this invention illustrating the spool in a position shifted to the left from the centered position shown in FIG. 1.
Figure 3:
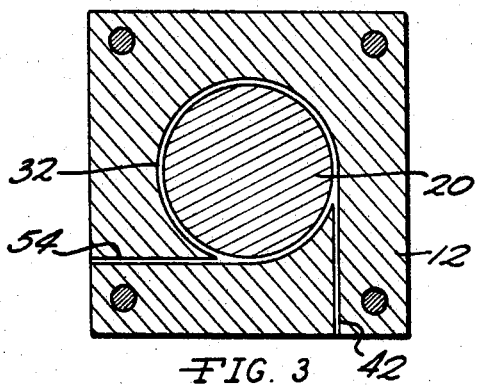
FIG. 3 is a reduced transverse sectional view of the valve assembly of this invention as seen from substantially the line 3—3 in FIG. 2.

With reference to the drawing, the servovalve assembly of this invention, indicated generally at 10, is illustrated in FIGS. 1 and 2 as including a hollow body 12 in which an axially shiftable valve element, namely, a spool 14, is mounted. The body 12 is provided with end walls 16 and cylindrical inner surface portions 18 which are disposed adjacent the end walls 16. The spool 14 has cylindrical end portions 20 disposed concentrically within and spaced from the body inner surface portions 18 and provided with end walls 22 which are spaced from the body end walls 16. The cylindrical end portion 20 at the right-hand end of the spool 14 thus cooperates with the adjacent body surface portion 18 and end wall 16 to form a generally cup-shape chamber 24 having an annular portion 26 surrounding the spool portion 20 and a disk-shape portion 28 at the spool end 22. The body 12 is provided with an end wall opening 30 which is axially aligned with the spool 14 and which communicates with the chamber 24 for a purpose to appear presently. A corresponding fluid chamber 32, having annular and disk-shape portions 34 and 36, respectively, is formed at the opposite end of the spool 14 and communicates with an opening 38 in the other spool end wall 16. The opening 38 is likewise axially aligned with the spool 14.

The chambers 24 and 32 constitute vortex chambers each of which is provided with a pair of control fluid inlet ports which extend tangentially of the chambers so that fluid entering the chambers from the inlet ports will induce swirl in the fluid in the chambers. The chamber 24 has one inlet port which communicates with a first fluid supply passage 40 that extends tangentially of the chamber 24 and is supplied with fluid at an adjustable pressure indicated as $P_{c1}$. Similarly, the chamber 32 has one inlet port which communicates with an inlet supply passage 42 supplied with fluid at an adjustable pressure indicated as $P_{c2}$. The chamber 24 has a second inlet port which is supplied with fluid from a feedback passage 44, which also extends tangentially of the chamber 24 and this pressure is indicated hereinafter as $P_{f1}$. The passage 44 communicates with a supply passage 46 provided with a restriction 48 and a second outlet which is in the form of a port 50 disposed in an exhaust chamber 52 formed in the body 12 intermediate its ends. Thus, the flow rate through the passage 44, and the pressure $P_{f1}$ therein, is dependent upon the flow rate through the port 50.

The chamber 32 is similarly supplied with fluid through a feedback passage 54, which extends tangentially of the passage 32 and which receives fluid from a supply passage 56 provided with a restriction 58 and connected to a feedback port 60 disposed in the exhaust chamber 52. Thus, the magnitude of the flow rate in the feedback passage 54 and the pressure $p_{f2}$ therein is dependent upon the flow rate through the feedback port 60.

The feedback ports 50 and 60 are disposed in inclined planes which are relatively reversely inclined. For example, the port 50 (FIG. 4) is disposed in a plane 61 inclined at an angle "$-a$" relative to the spool axis. The port 60 is inclined at an angle of "$+a$" with respect to the spool axis.

Figure 4:
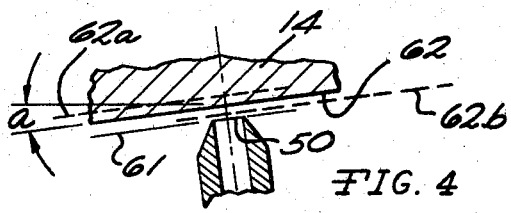
FIG. 4 is an enlarged fragmentary sectional view illustrating the position of a feedback port relative to a restricting surface portion on the spool in the valve assembly of this invention.

As shown in FIGS. 1 and 2, the spool 14 is formed intermediate its ends with a pair of relatively reversely inclined surface portions 62 and 64 disposed adjacent the feedback ports 50 and 60, respectively, and inclined with respect to the spool axis at the same angles as the planes of the ports 50 and 60, respectively. The surface portion 62 is sufficiently close to the port 50 to restrict flow from the port 50 into the exit chamber 52, and the surface portion 64 is similarly positioned relative to the feedback port 60. As a result of the arrangement of the surface portions 62 and 64 relative to the ports 50 and 60, when the spool 14 is shifted to the left, as viewed in FIG. 1, the restriction of the port 50 is decreased because the surface portion 62 is moved to a position in which it is spaced further from the port 50. The surface portion 64 is moved closer to the port 60 so as to increase the restriction at the feedback port 60. In the centered position of the spool valve 14 shown in FIG. 1, the feedback ports 50 and 60 are equally restricted. The relation of the inclined surface portion 62 to the feedback 50 is best illustrated in FIG. 4 which shows in solid lines the relative positions of these parts in the centered position of the spool 14. When the spool 14 is shifted to the left, the surface portion 62 is moved toward the dotted-line position indicated at 62a to decrease the restriction of the port 50, and when the spool 14 is moved to the right, the surface portion 62 is moved toward the dotted-line position indicated at 62b to increase the restriction of the port 50.

It is to be understood that while the surfaces 62 and 64 are illustrated as being smooth and relatively reversely inclined, these surfaces could be of different shapes so as to adapt the valve assembly 10 to a particular purpose. The essential function of the surfaces 62 and 64, in whatever form they may take, is to provide for an increase in the restriction of one of the feedback ports 50 and a decrease in restriction of the other feedback port in response to axial shifting movement of the spool 14.

The valve body 12 is provided with a pair of inlet ports 66 and 68 which communicate with an inlet passage 70 connected to a supply of fluid at pressure $P_s$. The body 12 is also provided with a pair of outlet ports 72 and 74 connected to output passages 76 and 78, respectively, which are illustrated as being connected to a two-way cylinder assembly 80 provided with a piston 82. In the centered position of the valve spool 14, a land 84 on the spool blocks communication between the inlet port 66 and the outlet port 72 and a similar land 86 blocks communication between the inlet port 68 and the outlet port 74. When the valve spool 14 is shifted to the left, as illustrated in FIG. 2, the land 86 is moved to a position in which the port 68 communicates through the valve body 12 with the outlet port 74, while the land 84 remains in a position blocking the inlet port 66. When the valve spool 14 is shifted to the right, the inlet port 68 is blocked and the inlet port 66 communicates with the outlet port 72.

As shown schematically in FIG. 1, there is clearance space 89 between the lands 84 and 86 and the body surface portions 18. These clearance spaces 89 constitute inlet passages providing for flow at all times of supply fluid from inlet ports 66 and 68 to the vortex chambers 24 and 32. This source of supply fluid for the chambers 24 and 32 is necessary for valve operation and can usually be obtained through the clearance spaces 89 without adversely affecting the spool guiding function of the lands 84 and 86. If necessary, the lands can be formed with flats or additional passages to provide the desired rate of flow of supply fluid for the chambers 24 and 32, this rate being greater than the rate of flow of control fluid to the chambers in the centered position of the spool 14.

As shown in FIG. 1, the inlet port 66 communicates at all times with the feedback inlet passage 46 through an outlet port 88 in the valve body 12 and the inlet port 68 similarly communicates at all times with the feedback inlet passage 56. The exhaust chamber 52 is provided with outlet passages 90 in the body 12.

It can thus be seen that the vortex chambers 24 and 32 cooperate with the supply fluid passages 89, the control fluid inlets 40, 44 and 42, 54, respectively, and the exit passages 30 and 38, respectively, to form fluid amplifiers, indicated generally at 92 and 94, respectively, disposed at opposite ends of the spool 14 and operable as fluid pilot stages to actuate the spool 14.

In the operation of the servovalve assembly 10, assume that the spool 14 is in its centered position shown in FIG. 1 and that $P_{c1}$ and $P_{c2}$ are equal. Under these circumstances, $P_{f1}$ and $P_{f2}$ are also equal so that the vortical flow through the vortex chamber exit passages 30 and 38 is identical so that in turn the pressures on the spool ends 22 are equal thereby retaining the spool 14 in its centered position. It is to be understood that the above considerations apply when the spool 14 is formed with the end portions 20 of equal size, as shown in the drawing, and the balance of the description of the operation of the valve 10 relates to this particular embodiment. It is within the purview of this invention to form the end portions 20 of unequal size, in which case $P_{c1}$ and $P_{c2}$ are not equal in the centered position of the spool 14, since it is equal oppositely directed forces, not pressures, which maintain the spool 14 in a given position.

Now assume that $P_{c1}$ is increased relative to $P_{c2}$. Since the inlet passages 40 and 42 to the fluid amplifier chambers 24 and 32 extend tangentially of the chambers, this increase in $P_{c1}$ relative to $P_{c2}$ will cause an increase in the vortical velocity of the fluid in the chamber 24. An increase in $P_{c1}$ will also cause a reduction in the rate of flow of supply fluid to chamber 24 through passage 89. Thus the flow rate through the exit passage 30 relative to the flow rate through the exit passage 38 is greatly reduced and the pressure in the chamber 24 will be increased relative to the pressure in the chamber 32 thereby unbalancing the fluid forces on the spool end walls 22 and causing the spool 14 to immediately move axially toward the left. Since the rate of flow of fluid to chamber 24 is reduced, and thus the rate of flow of fluid to chamber 32 is now increased relative to the rate of flow to chamber 24, the desired damping characteristics preventing over movement of spool 14 are automatically obtained in the valve assembly 10 without the necessity for providing an additional fluid source.

This movement of the spool 14 to the left will decrease the restriction at feedback port 50, since spool surface portion 62 will be moved toward the position shown at 62a in FIG. 4, and increase the restriction at feedback port 60. As a result, $P_{f1}$ will be decreased relative to $P_{f2}$. As a result, the flow rate into chamber 32 through passage 89 will now be decreased and the pressure in chamber 32 will increase immediately until it is equal to the fluid pressure in the chamber 24 thereby equalizing the fluid forces on the spool ends 22 in a moved position of the spool 14. The magnitude of movement of the spool 14 in each case is dependent upon the initial pressure differential between $p_{c1}$ and $Pc_2$. At all times, fluid exits from the exhaust chamber 52 through outlet ports 90 formed in the body 12.

In the shifted position of the spool 14, the ports 68 and 74 are communicated so that fluid is supplied through passage 78 to the cylinder assembly 80 to move the piston 82 toward the right. The flow rate in the inlet passage 70 is sufficient at all times to maintain flow through the feedback ports 50 and 60 so that in any moved position of spool 14 in which fluid is supplied to an outlet port 72 or 74 there is an ample supply of fluid to the valve 10 to avoid starving the system. It is desirable, for purposes of constant gain, to maintain sonic flow through the feedback ports 50 and 60 in the centered position of the spool 14, but if constant gain is not necessary in the system, the assembly 10 can be operated with subsonic flow through the ports 50 and 60.

It is apparent that in order to shift the spool 14 to the right at any time, it is only necessary to increase $P_{c2}$ relative to $P_{c1}$. By virtue of the utilization of vortex flow in the spool end chambers 24 and 32, the fluid state inputs are easily introduced in the valve pilot stage. In addition, by virtue of the utilization of the fluid amplifiers 92 and 94 in the valve assembly 10, an immediate response of the spool 14 is obtained with fluid flow and pressure changes for balancing purposes. It is to be understood that the fluid employed can be either a gas or a liquid and that a plurality of control fluid passages 40 and 42 can be provided for the amplifiers 92 and 94 as well as a plurality of feedback passages if desired for a particular valve purpose.

It will be understood that the fluid actuated valve assembly which is herein disclosed and described is presented for purposes of explanation and illustration and is not intended to indicate limits of the invention, the scope of which is defined by the following claims.

I claim:

1. In a valve assembly which includes a hollow body and an axially shiftable valve element mounted in said body for reciprocating axial movement, coacting means on said body and said element forming a pair of vortex fluid amplifiers at the ends of said element, means for supplying fluid to each of said amplifiers, whereby in response to a supply of fluid to said amplifiers at predetermined relative pressures providing for the application of equal and oppositely directed substantially axial forces on the ends of said element the element is maintained in a first position in said body and in response to a supply of fluid thereafter to said amplifiers at predetermined different relative pressures said element is moved axially to a second position, and means responsive to movement of said element toward said second position for increasing the pressure of fluid supplied to one of said amplifiers and decreasing the pressure of fluid supplied to the other one of said amplifiers sufficiently to provide for said axial forces on said element ends being equal in said second element position.

2. In a valve assembly having the structure set forth in claim 1 wherein said body is provided with fluid inlet and outlet openings disposed between said vortex fluid amplifiers, and land means on said element operable to block communication between said openings in said first element position, said land means being movable to an out-of-the-way position relative to certain of said openings in said second element position.

3. In a valve assembly having the structure set forth in claim 1 wherein said coacting means includes cylindrical end portions on said element having side and end walls, and end portions on said body each of which is provided with a cavity having a side wall which is spaced a substantially uniform distance radially outwardly from the side wall on one of said element end portions and an end wall spaced axially from the end wall for said one element end portion, so as to form fluid chambers at opposite ends of said element between said element end portions and said body portions.

4. In a valve assembly having the structure set forth in claim 3 wherein each of said body end walls is provided with an opening axially aligned with said element and communicating with the adjacent fluid chamber so as to form the exit passage for said chamber.

5. In a valve assembly having the structure set forth in claim 3 wherein said means for supplying fluid to each of said amplifiers includes first and second passage means communicating with each amplifier chamber, at least one of said passage means for each chamber being directed substantially tangentially of the element end portion in said chamber.

6. In a valve assembly having the structure set forth in claim 1 wherein said element has an intermediate portion provided with a pair of surface portions and said means for supplying fluid to said amplifiers includes a pair of passages corresponding to said amplifiers, each one of said passages having an inlet and a pair of outlets, a first one of each of said pair of outlets being in the form of a port at one of said amplifiers and a second one of each of said pair of outlets being in the form of a port disposed adjacent and in a restricted relation with one of said pair of surface portions, said surface portions being arranged relative to said second ports so that axial movement of said element increases the restriction of one of said second ports and decreases the restriction of the other one of said second ports to thereby increase the pressure at one of said first ports and decrease the pressure at the other one of said first ports.

7. In a valve assembly having the structure set forth in claim 6 wherein said surface portions are relatively reversely inclined at a predetermined angle relative to the axis of said element.

8. In a valve assembly having the structure set forth in claim 7 wherein each one of said second ports is located in a plane inclined with respect to the axis of said element at an angle substantially equal to the angle of inclination of the adjacent one of said pair of inclined element surface portions.

9. In a valve assembly which includes a hollow body and a spool mounted in said body for reciprocating axial movement, means providing fluidic pilot stage means in said body at opposite ends of said spool, means forming an exhaust chamber in said body between said spool ends, said exhaust chamber having an outlet passage and functioning continuously as an exhaust chamber, means for supplying fluid to said pilot stage means, said fluid supply means to each of said pilot stage means including a feedback fluid passage having an outlet emptying into one of said pilot stage means and an outlet port disposed in said exhaust chamber, said spool having an intermediate portion disposed in said exhaust chamber in a restricting relation with respect to said outlet ports such that the magnitude of the restriction of each outlet port changes with each axial movement of said spool, so that the flow rate and pressures in said feedback fluid passages are varied with spool position.

10. In a valve assembly having the structure set forth in claim 9 wherein each of said outlet ports is located in a plane inclined with respect to the axis of said spool at a predetermined angle with said planes being relatively reversely inclined, and said intermediate spool portion has a pair of relatively reversely inclined surface portions which are inclined with respect to said spool axis at angles corresponding to the inclinations of said planes, said surface portions being disposed adjacent and in a restricting relation with respect to said ports so that on axial movement of said spool in either direction the restriction of one of said ports is increased and the other is decreased.